Patented July 14, 1953

2,645,616

UNITED STATES PATENT OFFICE 2,645,616

ALUMINUM CHLORHYDROXY COMPLEX AND BORATE GEL

Thomas Govett, Summit, and Mildred L. Almquist, Maplewood, N. J., assignors to Reheis Company, Inc., a corporation of New York No Drawing. Application October 17, 1951, Serial No. 251,824

5 Claims. (Cl. 252—317)

This invention relates to an aluminum chlorhydroxy complex and borate gel and to the method of making it.

Gels made from the combination of aluminum chlorhydroxy complex with borax, sodium metaborate, or other soluble borate are described in our copending application Serial No. 170,694, filed June 27, 1950 for Aluminum Chlorhydroxy and Borate Gels, issued as Patent 2,607,658. The present application is a continuation-in-part of the earlier application.

As described in the copending application, there is used, as the base material in making the gel, a basic chloride containing aluminum, chlorine, and hydroxyl groups in the ratio of 5–7 atoms of aluminum for 3 of chlorine and a sufficient number of hydroxyl groups to make the total of the hydroxyl groups and chlorine atoms 3 for each atom of aluminum. A representative material of this type may be represented by the empirical formula $Al_6Cl_3(OH)_{15}$.

In our earlier application there is described also the use of borax or other borate to cause aqueous solutions of the selected aluminum chlorhydroxy complex to form a combination that gels in water without the need of adding any organic emolument or organic gelations material.

Gels so made are either too stiff at low temperatures for some purpose or too soft at elevated temperatures. Additives that are effective for correcting one of these conditions should be expected to aggravate the other. The present invention provides a composition and method for extending the temperature range over which the gel may be used, as in a collapsible tube with an outlet for extrusion of the gel, so that the gel is neither too soft at elevated summer temperatures nor too stiff at normal winter room temperatures. In other words, the invention provides for decreasing the temperature susceptibility of the product or raising the temperature of objectionable softening above that previously possible without a corresponding increase in the stiffness at low temperatures.

Briefly stated, the invention comprises the addition of an alcohol to the aqueous combination of borate and aluminum chlorhydroxy complex. In a modification, the invention comprises the incorporation also of a polyhydric alcohol such as glycerine serving as a lubricant to increase the extrudability at low temperatures without producing an objectionably low softening point.

As to materials, the gel combination to be modified is any one of those made with the aluminum chlorhydroxy complex and borax or other borate as described in the said copending application, namely, gels containing 5–7 atomic proportions of aluminum to 3 of chlorine and a borate as in the proportion corresponding to 1–5 atoms of boron for 9 of aluminum. From the gels of compositions within this range, we prefer for the present purpose those that are relatively very soluble in water. Examples are those in which the number of atoms of aluminum are 5–6 for 3 of chlorine, the boron content remaining within the range stated previously.

To provide the borate content of the gel, there is used borax or other alkali metal salt of a boric acid, examples being potassium tetraborate or potassium, sodium or ammonium orthoborate or metaborate.

The alcohol used to decrease the temperature susceptibility or change of consistency of the gel with temperature is a monohydric aliphatic alcohol that is miscible in all proportions with water and that is non-toxic under conditions of use of the finished gel. Since the finished gel is useful as an astringent and as a base in cosmetic and pharmaceutical preparations, methanol is ordinarily avoided because of its toxicity. Alcohols that meet other general requirements stated and that are used satisfactorily are ethanol, isopropanol, and 3-butanol.

As the lubricant there is used a polyhydric alcohol that is water soluble and non-toxic under the conditions of use and is a liquid that in the proportion used does not produce water insolubility of the aluminum chlorhydroxy complex and borate gel. In meeting these requirements, glycerine is outstanding. Since it is available ordinarily at a reasonable price, we use the glycerine as the lubricant to decrease the stiffness of our gel at low temperatures. The non-toxic, non-irritating glycols also meet the requirements and may be used, as for example, propylene and diethylene glycol.

Water is used in addition to the special additives in the gel. As to proportions, the aluminum chlorhydroxy complex and borate gel may be used in lower concentration in the improved gels than in those described in the copending application, without loss of the desired consistency of the gel. Thus we find that a gel made as described herein, with the alcohol additive and with 7.05% of the aluminum chlorhydroxy and borate gel, calculated as aluminum oxide, is satisfactory in consistency at the temperatures of use or storage varying over a considerable range. A similar gel without the added alcohol, on the other hand, would require approximately 10% of the gel so calculated for the proper consistency at summer temperatures in the southern part of the U. S.

The borate is used in the gel in the proportion to aluminum chlorhydroxy complex corresponding to about 1–5 atomic proportions of boron for 9 of aluminum.

As to the liquid medium for the gel, the proportion of the monohydric alcohol is made to be approximately 5–30 parts for 100 parts of total weight of the said chlorhydroxy complex, monohydric alcohol, and water. For most purposes we use 10–20 parts of the monohydric alcohol for 100 parts of it and water, all proportions here and elsewhere herein being expressed as parts by weight except as indicated in the case of the atomic proportions.

As the lubricant, glycerine is used in the proportion of approximately 2–10 parts for 100 of the total weight of the finished product.

In compounding, the selected ingredients in the proportions stated are mixed suitably in warm condition. The alcohol or the mixture of alcohol and glycerine to be used may be incorporated with the water at the time the inorganic constituents are dispersed in the water. In an alternative procedure, the aluminum chlorhydroxy and borate compound are first dissolved in the water in hot condition and the alcohol or the alcohol and glycerine are then added and stirred into the hot solution. In case the temperature of the mix to which the alcohol is to be added is so high as would cause substantial loss of alcohol by boiling or evaporation, the solution is first cooled to below the boiling point of the alcohol before the alcohol is added; or in an alternative procedure, the alcohol is introduced in an autoclave which will necessarily restrict the evaporation of alcohol.

The invention will be illustrated in greater detail by description in connection with the following specific examples of the practice of it.

The aluminum chlorhydroxy and borate gel, serving as the starting material for modification in the examples, was first prepared as follows: 200 parts of aluminum chlorhydroxy complex containing 6 Al to 3 Cl, equivalent to approximately 47% Al$_2$O$_3$, were dissolved in 200 parts of water and the solution brought to the temperature of 60° C. 40 parts of borax were dissolved separately in 449 parts of water and added with stirring to the said solution at 60° C. The resulting material (hereinafter referred to as "Solution A") contains aluminum equivalent to 10.6% Al$_2$O$_3$ and, if it were cooled, would set to a gel of properties to be improved by the additives shown in the specific examples that follow.

Example 1

A composition is made of the following formula:

| Ingredient | Parts by Weight |
|---|---|
| Solution A | 66.7 |
| Ethanol, approximately 93% | 15 |
| Glycerin | 4 |
| Water | 14.3 |
| Total | 100.0 |

The additives shown were stirred into the Solution A in warm condition at a temperature of 60° C. The product when cooled was a gel ready for use.

Example 2

The formula and procedure of Example 1 were used except that propylene glycol was substituted on an equal weight basis for the glycerine.

Example 3

The procedure of Example 1 is used except that the formula was as follows:

| Ingredient | Parts by Weight |
|---|---|
| Solution A | 66.7 |
| Ethanol, approximately 93% | 15 |
| Glycerin | 3 |
| Propylene glycol | 3 |
| Water | 12.3 |
| Total | 100.0 |

Example 4

The procedure and formulas of any of the Examples 1 to 3 above are used except that isopropanol and 3-butanol are substituted, in turn, for the ethanol on an equal weight basis.

Example 5

The procedure and formula of any one of the Examples 1 to 4 above are used except that the aluminum chlorhydroxy and borax complex used (Solution A) is one made with the Al:Cl ratio 5:3 or 7:3 and preferably 5:3.

Example 6

In this example, the borax used in making the Solution A is replaced by any of the other borates listed earlier herein, all other materials, proportions, and conditions being as stated in the Examples 1 to 5.

Example 7

The procedure and formula of Example 1 are modified by replacement of the glycerine by an equal weight of diethylene glycol.

The products made as described herein and particularly in the examples, set on cooling to a gel of low temperature susceptibility. The gel remains solid at temperatures up to 105° F. but is soft enough to be extruded at normal winter indoor temperatures.

Example 8

In a modification of the invention giving a stiffer, less extrudable gel which is satisfactory for some purposes, boric acid is substituted on a weight for weight basis for the borax in making the Solution A for use in each of the Examples 1–5 above.

Once the effects of our discovery have been observed various theories may be advanced to explain the mechanism of its operation. We consider that the effect of the monohydric alcohol is due in large part at least to the change which its admixture with water, to form a liquid aqueous alcoholic dispersing medium, causes in the degree of dispersion of the gel forming particles and that glycerine and the like serve as internal lubricants, promoting flow of the particles of gel past and over each other, even at low temperatures.

It will be understood that it is intended to cover all changes and modifications of the examples of the invention herein chosen for the purpose of illustration which do not constitute departures from the spirit and scope of the invention.

What is claimed is:

1. A gel consisting essentially of the combination of aluminum chlorhydroxy complex and an alkali metal borate, a water soluble non-toxic aliphatic monohydric alcohol, and water, the ratios of aluminum, chlorine and boron being 5–7 atomic proportions of aluminum to 3 of chlorine and 1–5 atomic proportions of boron to 9 of aluminum, and 100 parts by weight of the gel containing the monohydric alcohol in the proportion of 5–30 parts, the said combination of the complex and borate in amount to establish the desired consistency, and water in amount to make the total weight of the gel 100 parts.

2. The gel of claim 1 in which the monohydric alcohol is ethanol.

3. A gel consisting essentially of the combination of aluminum chlorhydroxy complex and an alkali metal borate, a water soluble non-toxic aliphatic monohydric alcohol, a water soluble non-toxic polyhydric alcohol serving as a lubricant in the gel, and water, the ratios of aluminum, chlorine, and boron being 5–7 atomic proportions of aluminum to 3 of chlorine and 1–5 atomic proportions of boron to 9 of aluminum, and 100 parts by weight of the gel containing 5–30 parts of the monohydric alcohol, 2–10 parts of the polyhydric alcohol, the said combination of complex and borate in amount to establish the desired consistency, and water in amount to make the total weight of the gel 100 parts.

4. The gel of claim 3 in which the polyhydric alcohol is glycerine.

5. The gel of claim 3 in which the polyhydric alcohol is a glycol.

THOMAS GOVETT.
MILDRED L. ALMQUIST.

No references cited.